: US005405118A

United States Patent [19]
Dietz et al.

[11] Patent Number: 5,405,118
[45] Date of Patent: Apr. 11, 1995

[54] RESILIENT SUPPORT ASSEMBLY PROVIDING VIBRATION SUPPRESSION

[75] Inventors: Peter Dietz, Clausthal; Otto Weber, Wolfsburg; Volkmar Keck, Wolfsburg, all of Germany

[73] Assignee: Volkswagen AG, Wolfsburg, Germany

[21] Appl. No.: 1,793

[22] Filed: Jan. 8, 1993

[30] Foreign Application Priority Data

Jan. 11, 1992 [DE] Germany .................. 42 00 531.0

[51] Int. Cl.⁶ .................................................. F16M 13/00
[52] U.S. Cl. ....................................... 248/632; 248/635; 267/141.4; 267/294
[58] Field of Search ............... 248/634, 635, 632, 352; 267/141.4, 141, 294; 123/195 A, 198 E

[56] References Cited

U.S. PATENT DOCUMENTS

| | | | |
|---|---|---|---|
| 2,869,811 | 1/1959 | Boschi | 267/141.4 |
| 2,926,881 | 3/1960 | Painter | 267/141.4 |
| 3,145,678 | 8/1964 | Shmorhun et al. | 248/632 X |
| 4,032,125 | 6/1977 | Minakawa et al. | 267/29 X |
| 4,432,537 | 2/1984 | Pletsch | 248/634 X |
| 4,720,086 | 1/1988 | LeSalner et al. | 248/634 X |
| 4,767,107 | 8/1988 | Lefol | 267/141.4 X |
| 4,895,115 | 1/1990 | Weber et al. | 248/632 X |
| 5,096,153 | 3/1992 | Seeley et al. | 248/635 |
| 5,102,107 | 4/1992 | Simon et al. | 248/634 X |
| 5,121,905 | 6/1992 | Mann et al. | 267/141.4 |
| 5,127,698 | 7/1992 | König | 248/635 X |
| 5,158,269 | 10/1992 | Hein et al. | 248/635 X |
| 5,170,985 | 12/1992 | Killworth et al. | 248/675 |

FOREIGN PATENT DOCUMENTS

| | | | |
|---|---|---|---|
| 8002600 | 6/1980 | Germany . | |
| 3903530 | 8/1989 | Germany . | |
| 738862 | 10/1955 | United Kingdom | 248/634 |

Primary Examiner—Ramon O. Ramirez
Assistant Examiner—Korie H. Chan
Attorney, Agent, or Firm—Brumbaugh, Graves, Donohue & Raymond

[57] ABSTRACT

A support assembly especially suitable as a drive unit support includes a block of resilient material having inserts made of substantially harder material with facing surfaces which extend in nonparallel directions to at least partially extinguish sound waves of disturbing vibration frequencies by interference after reflection from the surfaces.

4 Claims, 1 Drawing Sheet

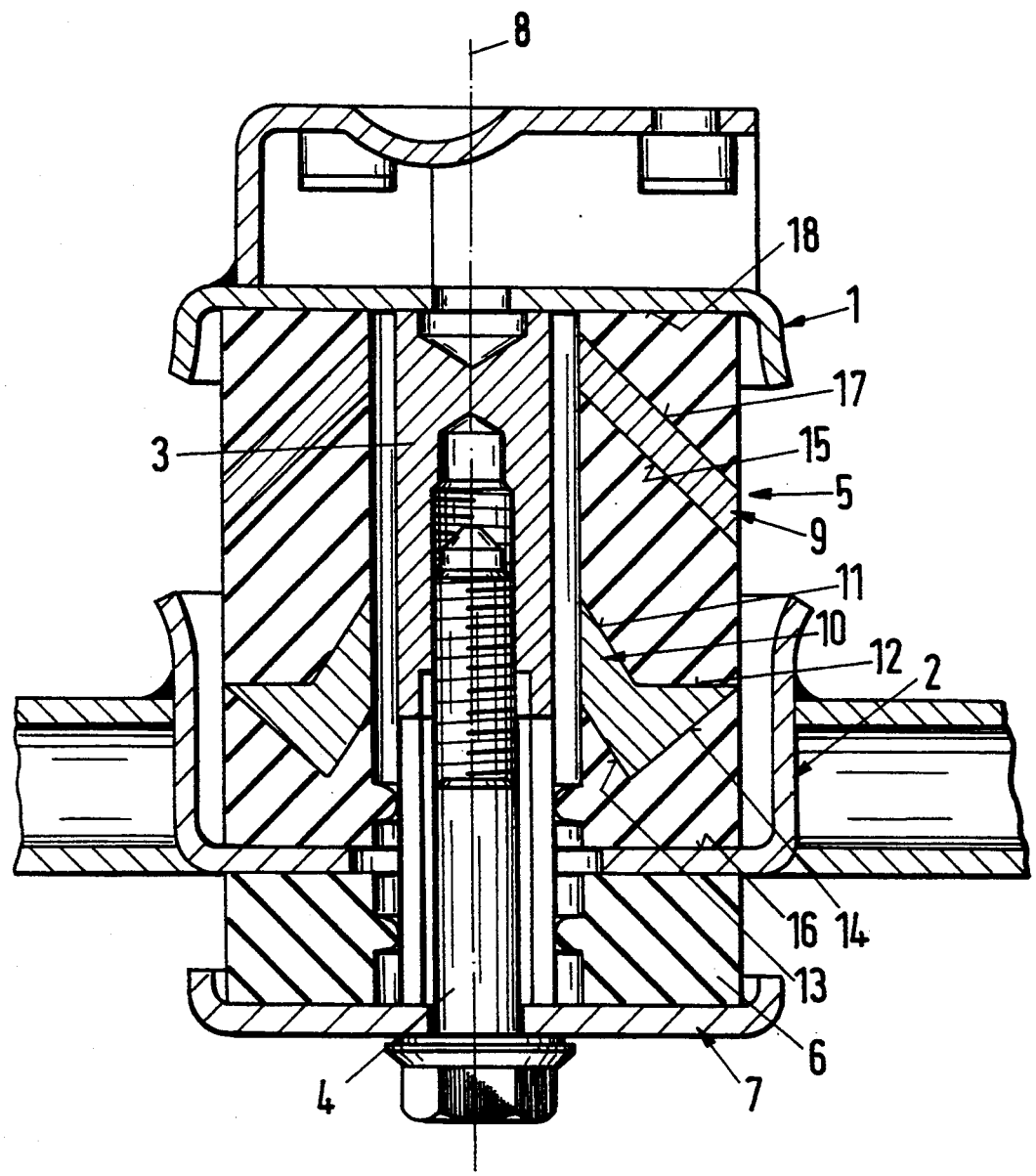

RESILIENT SUPPORT ASSEMBLY PROVIDING VIBRATION SUPPRESSION

BACKGROUND OF THE INVENTION

This invention relates to resilient support assemblies arranged to suppress vibration which may be used, for example, in motor vehicles.

German Gebrauchsmuster No. 80 02 600 discloses a resilient support assembly which includes a ring of resilient material in the shape of a cone segment clamped between facing conical surfaces of two metal parts. Embedded in the resilient ring are two steel rings in the form of cone segments having the same cone angle as the resilient ring, making the surfaces of the steel rings and of the resilient ring parallel to each other so as to suppress vibration by cancellation of sound waves at a particular frequency. However, suppressing vibration of a given frequency band in such support assemblies, as is necessary, for example, in the case of drive unit supports in motor vehicles, creates problems.

SUMMARY OF THE INVENTION

Accordingly, it is an object of the present invention to provide a support assembly which overcomes the disadvantages of the prior art.

Another object of the invention is to provide a resilient support assembly which, by a simple arrangement, obtains selective suppression of vibrations having different frequencies, at least in narrow frequency bands.

These and other objects of the invention are attained by providing a support assembly including a block of resilient material and a plurality of inserts incorporated in the block which are made of high-density material and have surfaces extending in nonparallel directions.

Accordingly, the invention utilizes the cancelling effect of interference between sound waves passing through the portion of the resilient block disposed between the facing surfaces by reflection or repeated reflection at the facing surfaces of the inserts. In addition, the inserts themselves may also have a sound-cancelling effect. However, it is important to provide an orientation of the facing surfaces of several inserts so that an opposite-phase superposition of vibration waves, and hence an at least significant extinction of vibration by interference, occurs in particularly disturbing frequency ranges.

BRIEF DESCRIPTION OF THE DRAWING

Further objects and advantages of the invention will be apparent from a reading of the following description in conjunction with the accompanying drawing, in which the sole FIGURE is an axial sectional view of a representative resilient supporting assembly arranged in accordance with the invention.

DESCRIPTION OF PREFERRED EMBODIMENT

In the typical embodiment of the invention shown in the drawing, a resilient support assembly of the general type disclosed in German Offenlegungsschrift No. 39 03 530 includes two metal force-transmitting support members 1 and 2 embracing a block 5 of resilient rubberlike material which is clamped between them by a threaded sleeve 3 and a screw 4. Another resilient block 6 is disposed between a screw support plate 7 and the opposite side of the support member 2.

In the illustrated example, the block 5 of resilient material has two inserts 9 and 10 each of which is axially symmetrical about the longitudinal axis 8 of the support assembly. The insert 9 is in the form of a conical ring segment with parallel surfaces, while the other insert 10 has sections of different shape with two annular surface regions 11 and 12 and 13 and 14 on opposite sides, respectively, extending at different angles with respect to the axis 8 so that they are not parallel to either the surfaces 15 of the other insert 9 or the surface 16 of the connecting piece 2 facing toward them. Similarly, the other surface 17 of the insert 9, which faces upwardly in the drawing, also extends in a direction which is not parallel to the surface 18 of the adjacent support member 1 which faces toward it.

This arrangement of the inserts 9 and 10 and these relative angular dispositions of the facing surfaces of the various high-density parts 1, 2, 9 and 10 with respect to one another cause sound waves of especially disturbing vibration frequencies conducted through the assembly to be at least largely extinguished by interference after reflection at the facing surfaces.

For this purpose, the inserts 9 and 10 must be made of high-density materials, such as metal or hard synthetic material, so as to ensure reflection, and preferably total reflection, of sound waves.

Tuning of the assembly to extinguish particularly disturbing frequencies of vibration may be effected by suitable selection of the spacing and the angle of inclination of the facing surfaces of the high-density parts. In the illustrated example, the surfaces 16 and 18 of the support members 2 and 1 may alternatively be used for controlling vibration.

The invention accordingly provides, by a simple arrangement, a resilient support assembly which permits selective control of vibration by interference.

Although the invention has been described herein with reference to specific embodiments, many modifications and variations therein will readily occur to those skilled in the art. Accordingly, all such variations and modifications are included within the intended scope of the invention.

We claim:

1. A support assembly having a longitudinal axis comprising a pair of metal support members extending transversely to the longitudinal axis of the support assembly and having opposed surfaces, a block of resilient material extending between and engaging the opposed support member surfaces to receive sound waves therefrom and a plurality of inserts made of hard high-density material disposed within the block in spaced relation to and axially symmetrical with respect to the longitudinal axis of the support assembly and in spaced relation to each of the metal support members to prevent sound waves therein from passing directly from the metal support members to the inserts, the inserts having facing surfaces which extend transversely to and are rotationally symmetric with respect to the longitudinal axis of the support assembly and which are not parallel to each other or to the opposed surfaces of the metal support members to effect at least partial extinction by interference of sound waves of disturbing frequency of vibration emanating from the metal support members and conducted through regions of the resilient block located between the inserts.

2. A support assembly according to claim 1 wherein at least some of the surfaces of the inserts have at least two surface regions which extend at an angle with respect to each other.

3. A support assembly according to claim 1 wherein the inserts are made of metal.

4. A support assembly according to claim 1 wherein the inserts are made of hard synthetic material.

* * * * *